(12) United States Patent  (10) Patent No.: US 8,434,879 B2
Nimura et al.  (45) Date of Patent: May 7, 2013

(54) CONTROL DEVICE AND PROJECTION-TYPE VIDEO-IMAGE DISPLAY DEVICE

(75) Inventors: Naoyuki Nimura, Moriguchi (JP); Miwa Yoneda, Moriguchi (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 166 days.

(21) Appl. No.: 13/116,888

(22) Filed: May 26, 2011

(65) Prior Publication Data

US 2011/0292303 A1  Dec. 1, 2011

(30) Foreign Application Priority Data

May 28, 2010  (JP) ................................. 2010-122786

(51) Int. Cl.
*G03B 21/14*  (2006.01)
(52) U.S. Cl.
USPC .......................................... 353/101; 353/121
(58) Field of Classification Search .................... 353/69, 353/70, 101
See application file for complete search history.

(56) References Cited

U.S. PATENT DOCUMENTS

| 6,530,666 B1* | 3/2003 | Smith et al. .................... 353/121 |
| 2009/0296050 A1* | 12/2009 | Ishida ............................ 353/101 |
| 2012/0236271 A1* | 9/2012 | Maruyama .................... 353/101 |

FOREIGN PATENT DOCUMENTS

JP  2000-241874 A  9/2000

* cited by examiner

*Primary Examiner* — William C Dowling
(74) *Attorney, Agent, or Firm* — NDQ&M Watchstone LLP

(57) ABSTRACT

A focus evaluation value calculation unit acquires a captured image captured by an image capturing unit and then analyzes the image so as to calculate, as a focus evaluation value, a characteristic value that changes in accordance with the focus state of a video image adjusted by a focus adjustment unit. A focus evaluation value storage unit stores the focus evaluation value and a target value of a focus evaluation value. A focus state determination unit determines a display color of focus state information, which is shown as a graph with a color indicating the degree of focus. The focus state determination unit includes: a unit for calculating a change of the focus evaluation value; and a unit for determining the focus state information to be displayed by referring to a table that associates a combination of the change of the focus evaluation value, the focus evaluation value, and the target value with the display color of the focus state information.

5 Claims, 9 Drawing Sheets

FIG. 5A

| STATE | WHETHER OR NOT MAXIMUM VALUE HAS BEEN DETECTED MaxFlag=0:UNDETECTED MaxFlag=1:DETECTED | COMPARISON BETWEEN PROVISIONAL MAXIMUM VALUE OR MAXIMUM VALUE AND CURRENT VALUE | COMPARISON BETWEEN INITIAL VALUE AND CURRENT VALUE | DISPLAY COLOR | DISPLAY AMOUNT | FLAG CHANGE |
|---|---|---|---|---|---|---|
| INCREASING CURRENT VALUE > AVERAGE VALUE | UNDETECTED | PROVISIONAL MAXIMUM VALUE < CURRENT VALUE ① | INITIAL VALUE < PROVISIONAL MAXIMUM VALUE | YELLOW | 75% | PROVISIONAL MAXIMUM VALUE ← CURRENT VALUE MaxFlag=0 |
| | | | INITIAL VALUE = PROVISIONAL MAXIMUM VALUE | YELLOW | 75% | PROVISIONAL MAXIMUM VALUE ← CURRENT VALUE MaxFlag=0 |
| | | PROVISIONAL MAXIMUM VALUE = CURRENT VALUE ② | INITIAL VALUE < PROVISIONAL MAXIMUM VALUE | YELLOW | 75% | — |
| | | | INITIAL VALUE = PROVISIONAL MAXIMUM VALUE | YELLOW | 75% | — |
| | | | INITIAL VALUE > PROVISIONAL MAXIMUM VALUE | YELLOW 25~75% | | — |
| | | PROVISIONAL MAXIMUM VALUE > CURRENT VALUE ③ | INITIAL VALUE < PROVISIONAL MAXIMUM VALUE | YELLOW | 75% | — |
| | | | INITIAL VALUE = PROVISIONAL MAXIMUM VALUE | YELLOW | 75% | — |
| | | | INITIAL VALUE > PROVISIONAL MAXIMUM VALUE | YELLOW 25~75% | | — |
| | DETECTED | MAXIMUM VALUE < CURRENT VALUE ④ | INITIAL VALUE < MAXIMUM VALUE | BLUE | 100% | — |
| | | | INITIAL VALUE = MAXIMUM VALUE | BLUE | 100% | — |
| | | | INITIAL VALUE > MAXIMUM VALUE | YELLOW 25~99% | | — |
| | | MAXIMUM VALUE = CURRENT VALUE ⑤ | INITIAL VALUE < MAXIMUM VALUE | | | — |
| | | | INITIAL VALUE = MAXIMUM VALUE | | | — |
| | | | INITIAL VALUE > MAXIMUM VALUE | | | — |
| | | MAXIMUM VALUE > CURRENT VALUE | INITIAL VALUE < MAXIMUM VALUE | | | — |
| | | | INITIAL VALUE = MAXIMUM VALUE | | | — |
| | | | INITIAL VALUE > MAXIMUM VALUE | | | — |

FIG. 5B

| STATE | WHETHER OR NOT MAXIMUM VALUE HAS BEEN DETECTED MaxFlag=0:UNDETECTED MaxFlag=1:DETECTED | COMPARISON BETWEEN PROVISIONAL MAXIMUM VALUE OR MAXIMUM VALUE AND CURRENT VALUE | COMPARISON BETWEEN INITIAL VALUE AND CURRENT VALUE | DISPLAY COLOR | DISPLAY AMOUNT | FLAG CHANGE |
|---|---|---|---|---|---|---|
| STATIONARY CURRENT VALUE ≥ AVERAGE VALUE | UNDETECTED | PROVISIONAL MAXIMUM VALUE<CURRENT VALUE ⑥ | INITIAL VALUE<PROVISIONAL MAXIMUM VALUE | YELLOW | 75% | PROVISIONAL MAXIMUM VALUE ←CURRENT VALUE MaxFlag←0 |
| | | | INITIAL VALUE=PROVISIONAL MAXIMUM VALUE | YELLOW | 75% | PROVISIONAL MAXIMUM VALUE ←CURRENT VALUE MaxFlag←0 |
| | | PROVISIONAL MAXIMUM VALUE=CURRENT VALUE ⑦ | INITIAL VALUE<PROVISIONAL MAXIMUM VALUE | YELLOW | 75% | — |
| | | | INITIAL VALUE=PROVISIONAL MAXIMUM VALUE | YELLOW | 75% | — |
| | | PROVISIONAL MAXIMUM VALUE>CURRENT VALUE ⑧ | INITIAL VALUE<PROVISIONAL MAXIMUM VALUE | YELLOW 25~75% | — | |
| | | | INITIAL VALUE=PROVISIONAL MAXIMUM VALUE | YELLOW 25~75% | — | |
| | DETECTED | MAXIMUM VALUE<CURRENT VALUE ⑨ | INITIAL VALUE<MAXIMUM VALUE | BLUE | 100% | — |
| | | | INITIAL VALUE=MAXIMUM VALUE | BLUE | 100% | — |
| | | MAXIMUM VALUE=CURRENT VALUE | INITIAL VALUE<MAXIMUM VALUE | YELLOW 25~99% | — | |
| | | | INITIAL VALUE=MAXIMUM VALUE | YELLOW 25~99% | — | |
| | | MAXIMUM VALUE>CURRENT VALUE ⑩ | INITIAL VALUE<MAXIMUM VALUE | YELLOW 25~75% | — | |
| | | | INITIAL VALUE=MAXIMUM VALUE | YELLOW 25~75% | — | |

FIG. 5C

| STATE | WHETHER OR NOT MAXIMUM VALUE HAS BEEN DETECTED MaxFlag=0:UNDETECTED MaxFlag=1:DETECTED | COMPARISON BETWEEN PROVISIONAL MAXIMUM VALUE OR MAXIMUM VALUE AND CURRENT VALUE | COMPARISON BETWEEN INITIAL VALUE AND CURRENT VALUE | DISPLAY COLOR | DISPLAY AMOUNT | FLAG CHANGE |
|---|---|---|---|---|---|---|
| DECREASING CURRENT VALUE < AVERAGE VALUE | UNDETECTED | PROVISIONAL MAXIMUM VALUE < CURRENT VALUE ① | | | | |
| | | PROVISIONAL MAXIMUM VALUE = CURRENT VALUE ② | | | | |
| | | PROVISIONAL MAXIMUM VALUE > CURRENT VALUE | INITIAL VALUE < PROVISIONAL MAXIMUM VALUE | | | |
| | | | INITIAL VALUE = PROVISIONAL MAXIMUM VALUE | | | |
| | | | INITIAL VALUE > PROVISIONAL MAXIMUM VALUE | RED | 25~75% | |
| | | | INITIAL VALUE < PROVISIONAL MAXIMUM VALUE | RED | 25~75% | |
| | DETECTED | MAXIMUM VALUE < CURRENT VALUE ③ | INITIAL VALUE = PROVISIONAL MAXIMUM VALUE | | | |
| | | MAXIMUM VALUE = CURRENT VALUE ④ | INITIAL VALUE > PROVISIONAL MAXIMUM VALUE | RED | 25~75% | |
| | | MAXIMUM VALUE > CURRENT VALUE | INITIAL VALUE < PROVISIONAL MAXIMUM VALUE | RED | 25~75% | |
| | | | INITIAL VALUE < MAXIMUM VALUE | | | |
| | | | INITIAL VALUE = MAXIMUM VALUE | | | |
| | | | INITIAL VALUE > MAXIMUM VALUE | | | MAXIMUM VALUE ← CURRENT VALUE MaxFlag ← 1 |
| | | | INITIAL VALUE < MAXIMUM VALUE | | | |
| | | | INITIAL VALUE = MAXIMUM VALUE | | | |
| | | | INITIAL VALUE > MAXIMUM VALUE | | | |
| | | | INITIAL VALUE < MAXIMUM VALUE | RED | 25~99% | |
| | | | INITIAL VALUE = MAXIMUM VALUE | RED | 25~99% | |
| | | | INITIAL VALUE > MAXIMUM VALUE | RED | 25~99% | |

CONTROL DEVICE AND PROJECTION-TYPE VIDEO-IMAGE DISPLAY DEVICE

CROSS-REFERENCE TO RELATED APPLICATIONS

This application is based upon and claims the benefit of priority from the prior Japanese Patent Application No. 2010-122766, filed on May 26, 2010, the entire contents of which are incorporated herein by reference.

BACKGROUND OF THE INVENTION

1. Field of the Invention

The present invention relates to a control device and a projection-type video-image display device on which the control device is mounted.

2. Description of the Related Art

In general, a projection-type video-image display device that projects a video image onto a screen needs to be adjusted to focus the video image projected onto the screen. In this regard, there exists a technique for automatically making various adjustments that are necessary for display by monitoring a projection screen by a camera.

Motors and instruments or the like for controlling the motors are necessary in order to automatically make various adjustments that are necessary for display, and the cost of the device may possibly be increased. Meanwhile, it can be troublesome for a user to adjust the focus by manually operating a focus ring. Thus, if the current focus state can be projected and displayed on a screen when a user manually adjusts the focus, the user-friendliness at the time of adjusting the focus can be improved while keeping down the cost.

SUMMARY OF THE INVENTION

In this background, a purpose of the present invention is to provide a supplemental means used when a user manually performs a focus adjusting operation.

An embodiment of the present invention relates to a control device mounted on a projection-type video-image display device including: a projection unit that projects a video image onto a screen via a lens; an image capturing unit that captures the screen; and a focus adjustment unit provided on the projection unit and operated manually. The device comprises: a focus evaluation value calculation unit configured to calculate, as a focus evaluation value, a characteristic value that changes in accordance with the focus state of the video image adjusted by the focus adjustment unit by acquiring a captured image captured by the image capturing unit and then by analyzing the image; a focus evaluation value storage unit configured to store the focus evaluation value calculated by the focus evaluation value calculation unit and a target value of a focus evaluation value; and a focus state determination unit configured to determine a display color of focus state information projected onto the screen as a graph with a color indicating the degree of focus. The focus state determination unit includes: a unit for acquiring the focus evaluation value stored in the focus evaluation value storage unit and calculating a change of the focus evaluation value; and a unit for determining focus state information to be displayed by referring to a table that associates a combination of the change of the focus evaluation value, the focus evaluation value, and the target value with the display color of the focus state information.

Another embodiment of the present invention relates to a projection-type video-image display device. The device comprises: a projection unit configured to project a video image onto a screen via a lens; an image capturing unit configured to capture the image of the screen; and the above-stated control device.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 5A is a diagram illustrating a table, according to the embodiment, that associates a combination of the focus evaluation value and the target value with a display color of focus state information when the focus state is "increasing";

FIG. 5B is a diagram illustrating a table according to the embodiment when the focus state is "stationary";

FIG. 5C is a diagram illustrating a table according to the embodiment when the focus state is "decreasing";

DETAILED DESCRIPTION OF THE INVENTION

The invention will now be described by reference to the preferred embodiments. This does not intend to limit the scope of the present invention, but to exemplify the invention.

The overview of the embodiment is now given. A projection-type video-image display device according to the embodiment supports, when the user adjusts a focus, a focus operation by analyzing an image after acquiring a video image projected onto a screen and then by displaying a focus state as a graph with a color.

Figure 1:
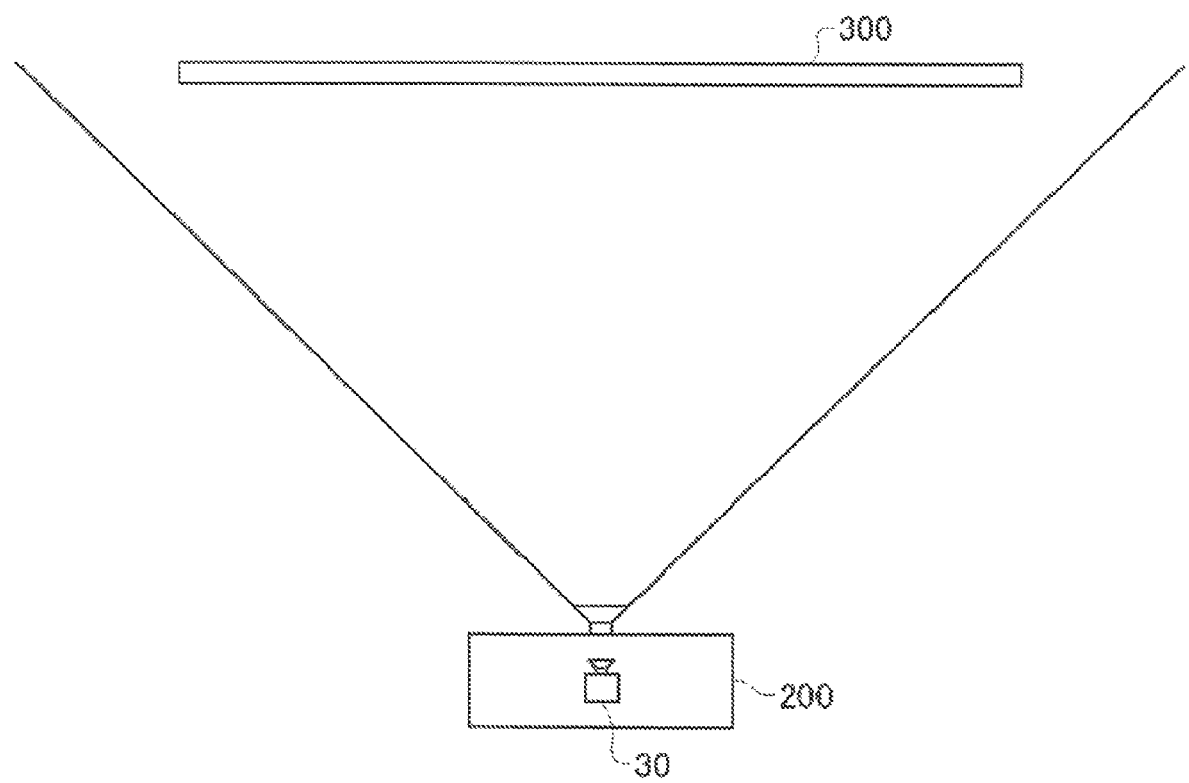
FIG. 1 is a diagram illustrating a positional relationship between a projection-type video-image display device and a screen according to the embodiment of the present invention.

FIG. 1 is a diagram illustrating a positional relationship between a projection-type video-image display device 200 and a screen 300 according to the embodiment of the present invention. The projection-type video-image display device 200 includes an image capturing unit 30 for capturing an image in the direction of the screen 300. The image capturing unit 30 is placed so that the center of the optical axis thereof and the center of the optical axis of a projected light projected from the projection-type video-image display device 200 are, for example, parallel to each other. In FIG. 1, the screen 300 faces the projection-type video-image display device 200.

In the projection-type video-image display device 200, a focus adjustment is performed by manually moving a focus ring provided in front of the lens. In order to assist this focus adjustment, the projection-type video-image display device 200 displays focus state information on the screen 300. The user can perform an appropriate focus adjustment by moving the focus ring while referring to this focus state information.

Figure 2:
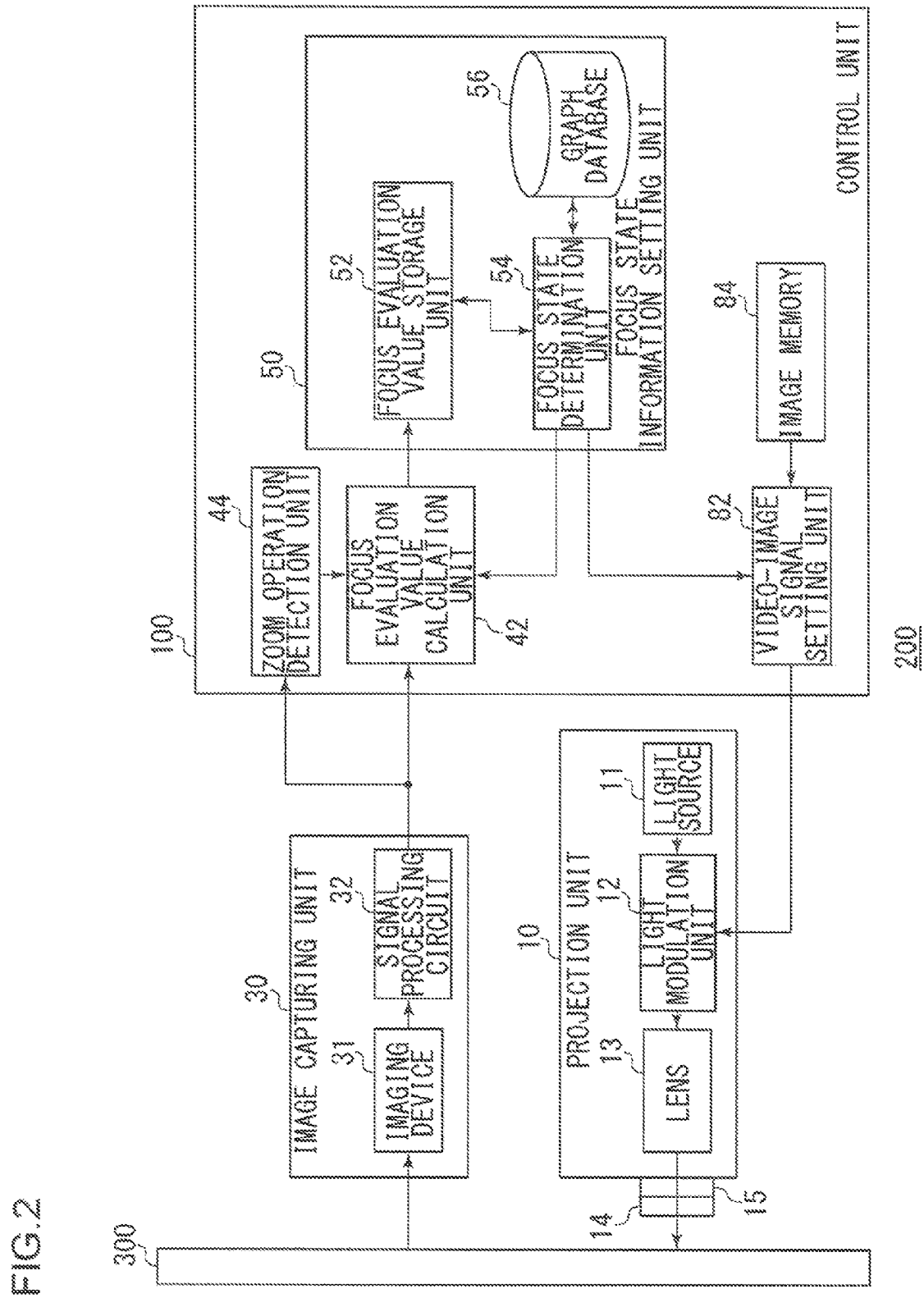
FIG. 2 is a diagram schematically illustrating the functional configuration of the projection-type video-image display device according to the embodiment.

FIG. 2 is a diagram schematically illustrating the functional configuration of the projection-type video-image display device 200 according to the embodiment. The projection-type video-image display device 200 includes a projection unit 10, the image capturing unit 30, and a control unit 100. The control unit 100 includes a focus evaluation value calculation unit 42, a zoom operation detection unit 44, a focus state information setting unit 50, a video-image signal setting unit 82, and image memory 84.

The projection unit 10 projects a video image onto the screen 300. The projection unit 10 includes a light source 11, a light modulation unit 12, a lens 13, a zoom ring 14, and a focus ring 15. As the light source 11, a halogen lamp having a filament-type electrode structure, a metal halide lamp having an electrode structure in which an arc discharge is generated, a xenon short arc lamp, a high pressure mercury lamp, a LED (Light Emitting Diode), or the like can be employed.

The light modulation unit 12 modulates a light, which enters from the light source 11, in accordance with a video-image signal set by the video-image signal setting unit 82. As the light modulation unit 12, for example, a DMD (Digital Micromirror Device) can be employed. The DMD is provided with a plurality of micromirrors corresponding to the number of pixels and generates a desired video-image light by controlling the direction of each of the micromirrors in accordance with each pixel signal.

The lens 13 adjusts the focal distance and the focus of a light entering from the light modulation unit 12. Although not shown in the figure, the lens 13 includes a zoom lens for moving the focal distance and a focusing lens for adjusting the focus. The lens 13 is provided with the zoom ring 14 and the focus ring 15. When the user manually rotates the zoom ring 14 or the focus ring 15, the lens position moves along the optical axis. A video-image light generated by the light modulation unit 12 is projected onto the screen 300 via the lens 13. An arbitrary device other than the zoom ring 14 and the focus ring 15 may be used as long as the device moves the lens position along the optical axis.

As primary objects, the image capturing unit 30 captures the image of the screen 300 and a projected image that is projected onto the screen 300. The image capturing unit 30 includes a solid-state imaging device 31 and a signal processing circuit 32. As the solid-state imaging device 31, a CMOS (Complementary Metal Oxide Semiconductor) image sensor, a CCD (Charge Coupled Device) image sensor, or the like can be employed. The signal processing circuit 32 performs various signal processes on a signal that is output from the solid-state imaging device 31 such as A/D (Analog/Digital) conversion, conversion from an RGB format to a YUV format, or the like and then outputs the signal to the control unit 100.

The focus evaluation value calculation unit 42 calculates, by acquiring a captured image captured by the image capturing unit 30 and then by analyzing the image, as a focus evaluation value, a characteristic value that changes in accordance with the focus state of a video image adjusted by the focus ring 15. The focus evaluation value is used for a focus assistant function.

The "focus assistant function" is a function of displaying, in a superimposed manner, the focus state information for assisting the focus adjustment by the manual operation of the focus ring 15, as at least a part of a projection picture plane on the screen 300. Details of the focus state information will be described later. In the present embodiment, the focus state information is displayed in a superimposed manner when the user manually adjusts the focus. As a video image displayed along with the focus state information, a video image signal may be directly used or a pattern used only during the focusing may be displayed.

As the focus evaluation value, an arbitrary characteristic value, such as a high-frequency component, contrast information, and brightness information of the captured image, can be used that changes in accordance with the focus state of a video image projected onto the screen. For example, an arbitrary image analysis technique such as the Fourier transform, multi-resolution analysis, and edge extraction can be used for the calculation of the high-frequency component or the contrast from the captured image. The focus evaluation value is calculated for the entire captured image or for each area obtained by dividing the captured image into a plurality of areas. Preferably, the focus evaluation value is calculated for a predetermined time interval or for every predetermined number of frames.

The zoom operation detection unit 44 determines, by acquiring a captured image captured by the image capturing unit 30 and then by analyzing the image, whether or not the zoom ring 14 is being operated by the user. This can be achieved by extracting an edge component in the image followed by detecting the increase or decrease in edge components. As an image to be analyzed for the detection of the zoom operation, a video image signal may be directly used or a pattern used only for the zoom detection may be used.

The focus state information setting unit 50 sets the focus state information displayed on the screen 300 as the above-stated focus assistant function. The focus state information setting unit 50 includes a focus evaluation value storage unit 52, a focus state determination unit 54, and a graph database 56. In reference to FIGS. 3, 4, 5, and 6, a detailed description will be made in the following regarding the configuration of the focus state information setting unit 50.

Figure 3:
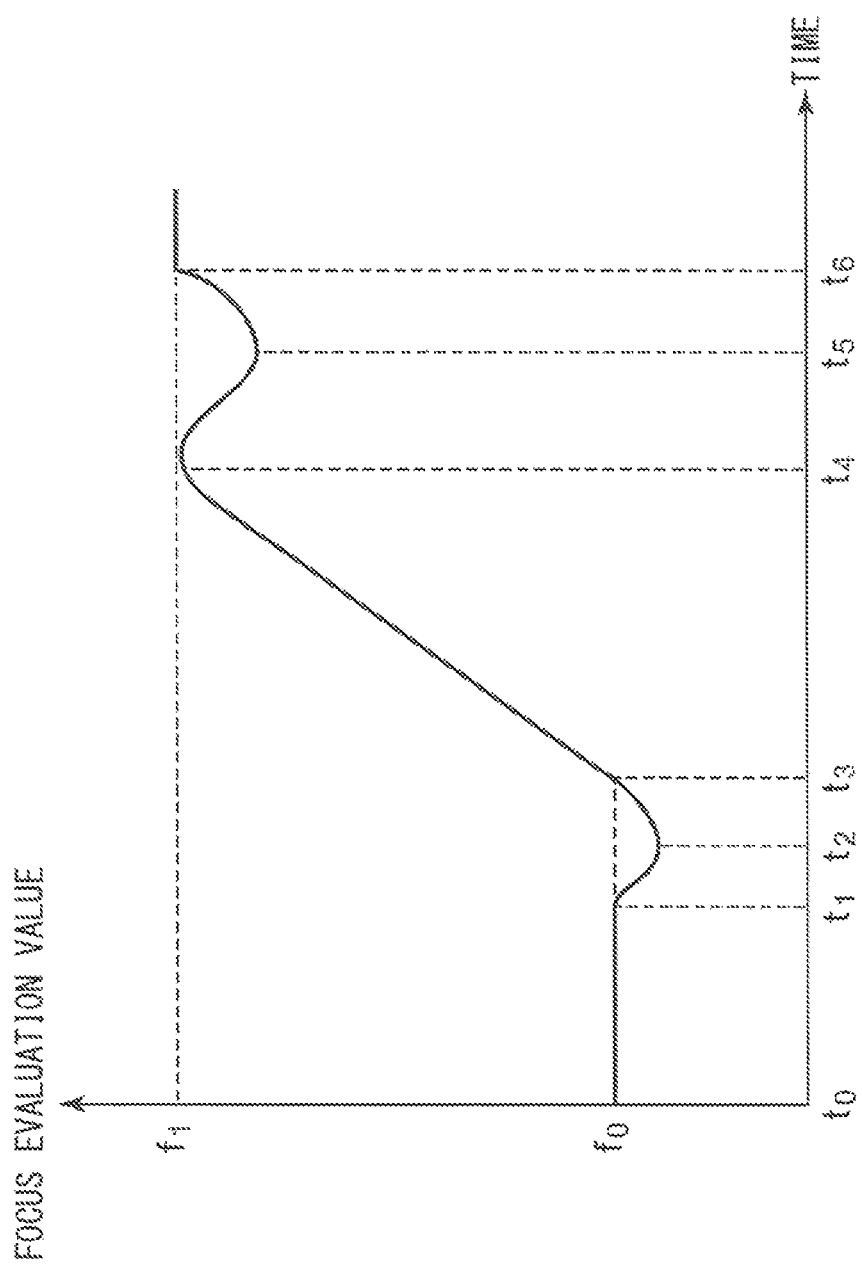
FIG. 3 is a diagram illustrating an example of a change in a focus evaluation value at the time of focus adjustment according to the embodiment.

FIG. 3 is a diagram illustrating an example of a change when a high-frequency component of a captured image is used as a focus evaluation value at the time of focus adjustment. The following example is based on the premise that the value of the focus evaluation value increases as the focus state is improved.

It is assumed that the projection-type video-image display device 200 is powered on so that a video image is displayed on the screen 300 at time $t_0$. In this case, the image is usually out of focus, and the captured image that is captured by the image capturing unit 30 is a defocused image with little high-frequency component. The focus is not adjusted during a time period between time $t_0$ and time $t_1$, and the focus evaluation value does not change. The focus evaluation value storage unit 52 stores a value $f_0$, which is acquired from the focus evaluation value calculation unit 42, as an initial value of the focus evaluation value. The focus evaluation value storage unit 52 also stores the value $f_0$ as a provisional maximum value $f_m$ of the focus evaluation value. The "provisional maximum value $f_m$" is the maximum focus evaluation value previously calculated by the focus evaluation value calculation unit 42.

At time $t_1$, the user starts adjusting the focus. During a time period between time $t_1$ and time $t_2$, a focus evaluation value f is smaller than the initial value $f_0$ due to the adjustment made by the user in a wrong direction, that is, in a direction that causes further defocusing. In the following, a simple notation of "f" without any subscript indicates a current focus evaluation value. The focus evaluation value storage unit 52 stores, in addition to the initial value $f_0$, the current focus evaluation value f every time the current focus evaluation value f is calculated.

At time $t_2$, the user starts adjusting the focus in a right direction. The current focus evaluation value f increases and reaches the initial value $f_0$ at time $t_3$. After time $t_3$, the focus evaluation value f continues to increase, and the focus evaluation value storage unit 52 thus updates the provisional maximum value $f_m$ to be the focus evaluation value f, accordingly.

As a result of the continuous adjustment by the user in the right direction, the focus evaluation value f reaches a peak value $f_1$ at time $t_4$ and decreases afterward. This is because further continuation of the focus adjustment after the focus is adjusted causes defocusing, and the video image thus becomes defocused. The user readjusts the focus at time $t_5$, and the focus evaluation value f reaches the peak value $f_1$ again at time $t_6$. The focus adjustment is completed at time $t_6$.

The focus state determination unit 54 calculates a previously-calculated average focus evaluation value $f_a$ and stores the result thereof in the focus evaluation value storage unit 52. The focus state determination unit 54 also detects the previously-stated peak focus evaluation value $f_1$ and stores the peak value in the focus evaluation value storage unit 52 as the maximum focus evaluation value $f_M$. More specifically, the focus state determination unit 54 tracks the amount of a change in the focus evaluation value and sets the focus evaluation value f, obtained when the amount of a change changes from increase to decrease, to be the maximum focus evaluation value $f_M$. Since the maximum focus evaluation value $f_M$ is a focus evaluation value obtained when the focus is adjusted, the maximum focus evaluation value $f_M$ is a target focus evaluation value.

The magnitude relationship between the current focus evaluation value f and the target focus evaluation value is used as the previously-stated focus state information. In order to express the focus state information as a graph with a color indicating the degree of focus, the focus state determination unit 54 determines a display mode of the graph.

FIG. 4 is a diagram illustrating an example of a graph that expresses the focus state information. FIG. 4A is a diagram illustrating an example of a graph at the time of starting the focus adjustment, and the graph represents the period between time $t_0$ and time $t_1$ in FIG. 3. The graph is projected while overwriting a video image projected into the screen. A rectangle whose longitudinal direction is in the horizontal direction of the video image represents the graph. The focus evaluation value and the memory of the graph are associated with each other, and the color of the graph and the dimensions of a colored area increase or decrease in accordance with a change in the focus evaluation value. In the example shown in FIG. 4A, three-fourth of the area of the graph is colored. In the following, it is assumed that an area expressed with diagonal lines indicates an area that is yellow and that an area expressed with diagonal grids indicates an area that is red. In FIG. 4, the memory width of the left end portion of a graph is larger than that of the right end portion, and a colored area increases or decreases greatly in the left end portion. Contrarily, a colored area increases or decreases by small amounts in the right end portion. This allows the user to understand a detailed focus state as the focus is adjusted to the right focus. Thus, this is advantageous in that the user friendliness is improved.

Figure 4A:
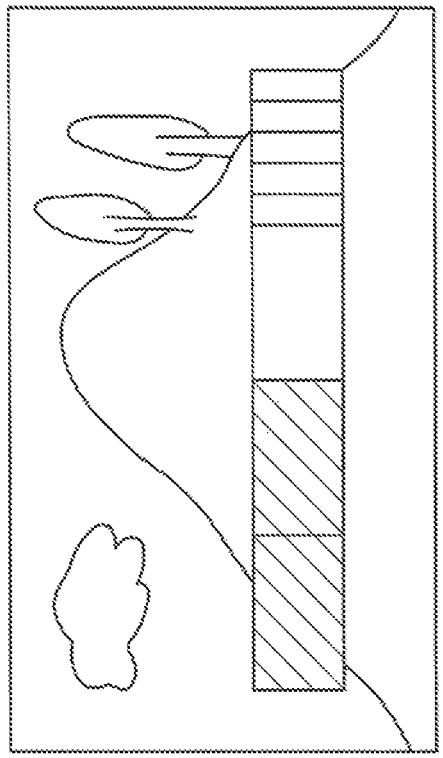
FIG. 4A is a diagram illustrating an example of a graph at the time of starting the focus adjustment according to the embodiment.
Figure 4B:
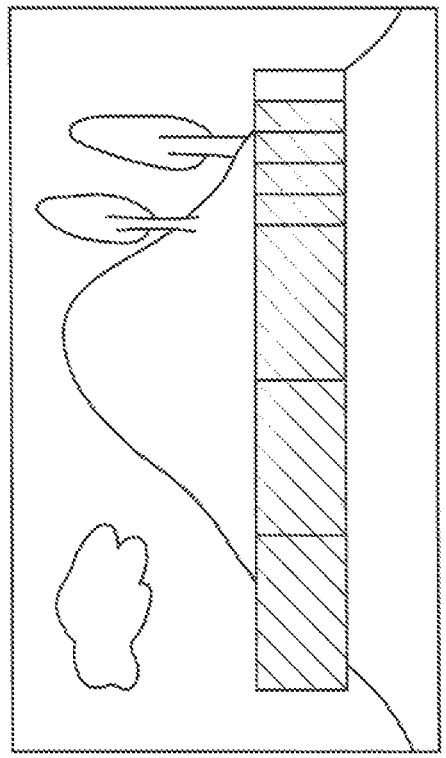
FIG. 4B is a diagram illustrating an example of a graph when the focus evaluation value is smaller than the earlier maximum value during a period when a target value of the focus evaluation value according to the embodiment is not detected.

FIG. 4B is a diagram illustrating an example of a graph when the focus evaluation value f is smaller than the provisional maximum value $f_m$ during a period when the previously-stated maximum focus evaluation value $f_M$, i.e., a target focus evaluation value is not detected. FIG. 4B represents the period between time $t_1$ and time $t_2$ in FIG. 3. The length of an area colored in yellow in the graph changes in accordance with the value of the focus evaluation value f. Although not shown in the figure, a period during which the focus evaluation value f continues to increase (a period between time $t_3$ and $t_4$ in FIG. 3) is indicated by the same graph as that of the example shown in FIG. 4A during a period when the maximum value of the previously-stated maximum focus evaluation value $f_M$, i.e., the target focus evaluation value is not detected.

Figure 4C:
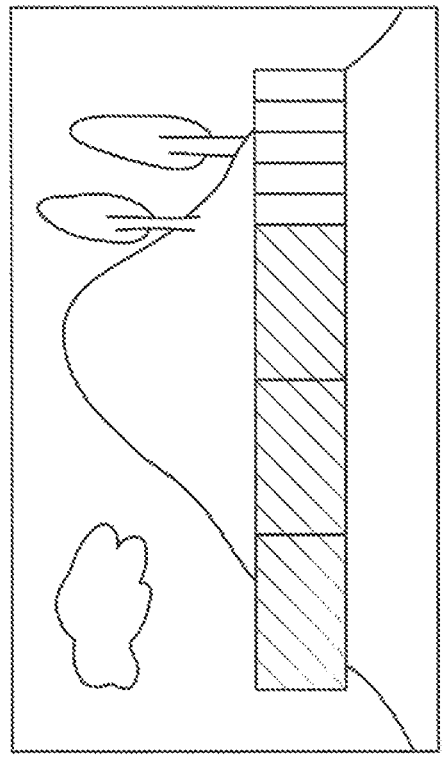
FIG. 4C is a diagram illustrating an example of a graph when the focus evaluation value decreases during a period after a target value of the focus evaluation value according to the embodiment is detected.

FIG. 4C is a diagram illustrating an example of a graph when the focus evaluation value f decreases during a period after the target value of the focus evaluation value f is detected. FIG. 4C represents the period between time $t_4$ and time $t_5$ in FIG. 3. The display color of a colored area that accounts for three-fourth of the graph changes from yellow to red.

Figure 4D:
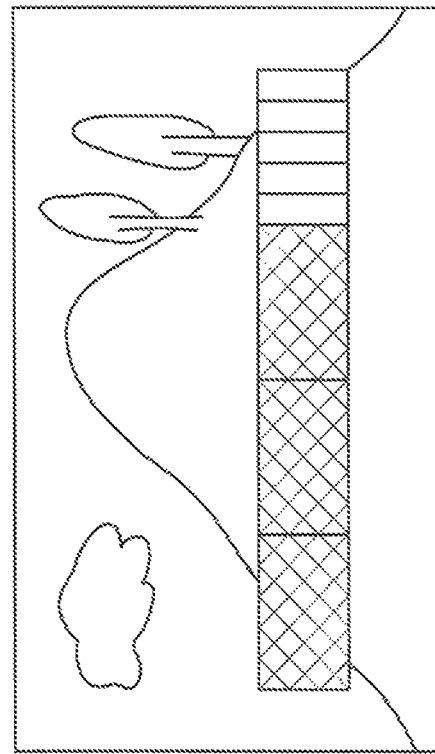
FIG. 4D is a diagram illustrating an example of a graph when the focus evaluation value increases during a period after a target value of the focus evaluation value according to the embodiment is detected.

FIG. 4D is a diagram illustrating an example of a graph when the focus evaluation value f increases during a period after the target value of the focus evaluation value f is detected. FIG. 4C represents the period between time $t_5$ and time $t_6$ in FIG. 3. Almost all the area of the graph is colored in yellow. Although not shown, the entire area of the graph turns blue at the point when the focus evaluation value f becomes equal to the maximum value $f_M$, which is a target value, and the user is notified of the completion of the focus adjustment. As described above, the focus state information is used as a supplemental means used when the user manually performs the focus adjusting operation.

FIGS. 5A, 5B, and 5C are diagrams each illustrating a table that associates a combination of the focus evaluation value and the target value with the display color and the amount of display of the focus state information. Each table shown in FIGS. 5A, 5B, and 5C is stored in the graph database 56, and the focus state determination unit 54 determines the focus state information to be displayed in reference to the table.

More specifically, the focus state determination unit 54 acquires the focus evaluation value stored in the focus evaluation value storage unit 52 and calculates the change in the focus evaluation value. First, the focus state determination unit 54 checks the magnitude relationship between the current value f and the average value $f_a$ of the focus evaluation and determines the focus state whether the current value f is "increasing," "stationary," or "decreasing" with respect to the average value $f_a$. FIG. 5A is a diagram illustrating a table when the focus state is "increasing," FIG. 5B is a diagram illustrating a table when the focus state is "stationary," and FIG. 5C is a diagram illustrating a table when the focus state is "decreasing." The focus state determination unit 54 determines whether or not the maximum value $f_M$, which is the target focus evaluation value, has been detected. When the maximum value $f_M$ has not been detected, the focus state determination unit 54 checks both the magnitude relationship between the provisional maximum value $f_m$ and the current focus evaluation value f and the magnitude relationship between the initial value $f_0$ and the provisional maximum value $f_m$ of the focus evaluation value.

When the maximum value $f_M$ has been detected, the focus state determination unit 54 checks both the magnitude relationship between the maximum value $f_M$ and the current focus evaluation value f and the magnitude relationship between the initial value $f_0$ and the maximum value $f_M$ of the focus evaluation value. Checking the above relationships allows the focus state determination unit 54 to determine, from the table stored in the graph database 56, the focus state information to be displayed. Whether or not the maximum value $f_M$ has been detected can be determined by checking the value of a flag (MaxFlag), stored in work memory (not shown), that indicates whether or not the maximum value $f_M$ has been detected. The flag is initialized at zero and is set to be one when the focus state determination unit 54 detects the maximum value $f_M$.

Figure 6:
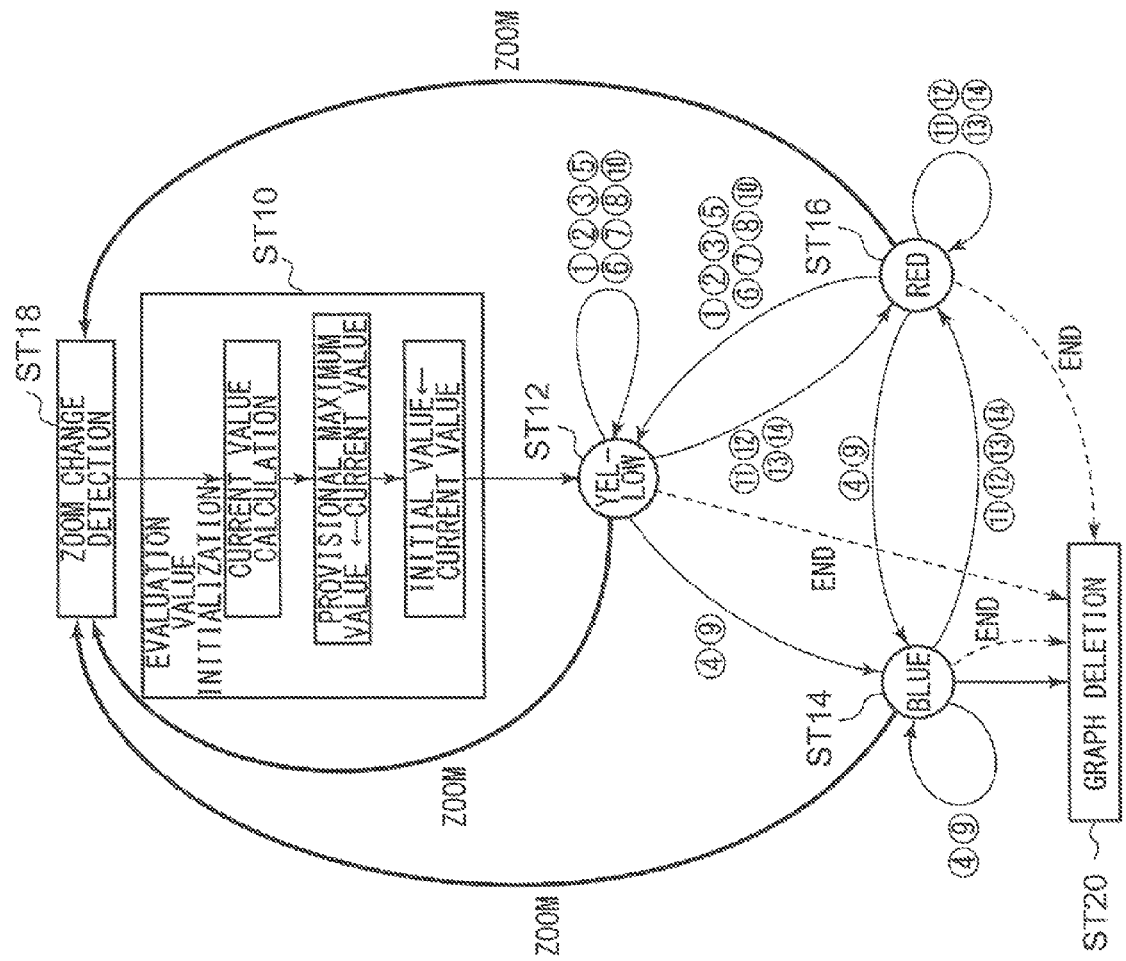
FIG. 6 is a diagram illustrating the state transition of the display color of the focus state information according to the embodiment.

FIG. 6 is a diagram illustrating the state transition of the display color of the focus state information. In FIG. 6, a possible state for the display color of the focus state information is expressed by a combination of a notation ST (an abbreviation for the term "state") meaning a state and a number. When the control unit 100 is activated and when the focus evaluation value calculation unit 42 calculates the focus evaluation value f, the state is expressed as an evaluation-value initialized state ST10. In the evaluation-value initialized state ST10, an evaluation value initially calculated by the focus evaluation value calculation unit 42 is stored in the focus evaluation value storage unit 52 as the provisional maximum value $f_m$ and as the initial value $f_0$.

When the provisional maximum value $f_m$ and the initial value $f_0$ are stored in the focus evaluation value storage unit 52, the state is changed to a yellow display state ST12. The state can be changed from the yellow display state ST12 to the same yellow display state ST12, a red display state ST16, a blue display state ST14, a graph-deleted state ST20, and a zoom-change detected state ST18.

A circled number in FIG. 6 corresponds to a circled number in each table shown in FIGS. 5A, 5B, and 5C. For example, the display state changes from the yellow display state ST12 to the blue display state ST14 in the following two cases. In other words, one case is when the current focus evaluation value f is larger than the average value $f_a$, when the maximum value $f_M$ has been detected, and when the current value f and the maximum value $f_M$ are equal to each other, and the other case is when the current focus evaluation value f and the average value $f_a$ are equal to each other, when the maximum value $f_M$ has been detected, and when the current value f and the maximum value $f_M$ are equal to each other.

When the user operates the zoom ring 14, the size of a video image projected into the screen 300 changes, and the focus evaluation value thus changes. Therefore, the provisional maximum value $f_m$ and the maximum value $f_M$ that are obtained earlier do not have any meaning anymore. The detection of the user's operation of the zoom ring 14 by the zoom operation detection unit 44 leads the states to change from the yellow display state ST12, the blue display state ST14, and the red display state ST16 to the zoom-change detected state ST18. As a result, an operation such as the initialization of the focus evaluation value f is performed again. This is advantageous in that the reliability of the focus evaluation value can be secured.

If the user forcibly terminates the focus adjustment during the yellow display state ST12, the blue display state ST14, and the red display state ST16, the state changes to the graph-deleted state ST20, and the focus adjustment is terminated.

FIG. 2 is referred back. The image memory 84 stores image data to be projected onto the screen 300. The image data is provided from a video-image reproduction device such as a personal computer and a DVD player via an external interface (not shown). The video-image signal setting unit 82 sets, for the light modulation unit 12, a video-image signal based on the image data stored in the image memory 84.

The configuration of the control unit 100 is implemented in hardware by any CPU of a computer, memory, or other LSI's, and in software by a program or the like loaded into the memory. Functional blocks implemented by the cooperation of hardware and software are depicted. Thus, a person skilled in the art should appreciate that there are many ways of accomplishing these functional blocks in various forms in accordance with the components of hardware only, software only, or the combination of both.

Figure 7:
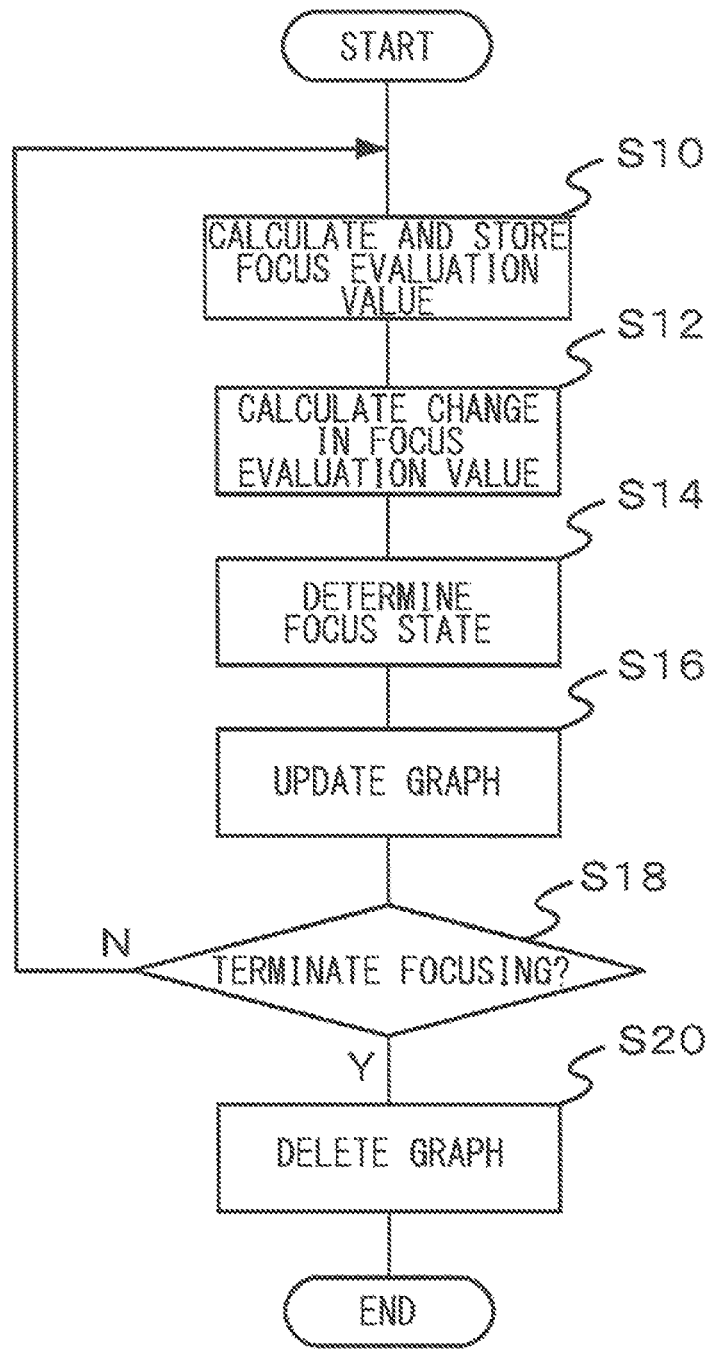
FIG. 7 is a flow chart mainly illustrating a process flow of a control unit according to the embodiment.

FIG. 7 is a flow chart mainly illustrating a process flow of the control unit 100 according to the embodiment. The process in the flowchart starts, for example, when the projection-type video-image display device 200 is powered on and when the image capturing unit 30 captures a video image projected on the screen 300.

The focus evaluation value calculation unit 42 calculates, by acquiring a captured image captured by the image capturing unit 30 and then analyzing the image, as a focus evaluation value, a characteristic value that changes in accordance with the focus state of a video image adjusted by the focus ring 15 and store the characteristic value in the focus evaluation value storage unit 52 (S10). The focus state determination unit 54 acquires the focus evaluation value stored in the focus evaluation value storage unit 52 and calculates the change in the focus evaluation value (S12).

The focus state determination unit 54 determines the focus state information to be displayed by referring to a table that associates a display color of the focus state information with a combination of the magnitude relationship between the current focus evaluation value f and the average value $f_a$, the magnitude relationship between the maximum value $f_M$ or the provisional maximum value $f_m$ and the current focus evaluation value f, and the magnitude relationship between the maximum value $f_M$ or the provisional maximum value $f_m$ and the initial value $f_0$ (S14). The video-image signal setting unit 82 acquires the focus state information from the focus state determination unit 54 as a graph with a color indicating the degree of the focus and transmits the focus state information to the projection unit 10 so as to update the graph displayed on the screen 300 (S16).

When the current focus evaluation value f and the maximum value $f_M$ do not coincide with each other and when the focus adjustment has not been completed (N in S18), processes from the step S10 through the step S16 are repeated. When the current focus evaluation value f and the maximum value $f_M$ coincide with each other and when the focus adjustment is completed (Y in S18), the focus state determination unit 54 instructs the video-image signal setting unit 82 to delete the graph so that the graph is deleted (S20). When the graph is deleted in the step S20, the process in the flowchart is completed.

An explanation is given of the operation of the above configuration in the following. The user projects a video image onto the screen 300 by using the projection-type video-image display device 200 according to the embodiment and adjusts the focus by operating the focus ring 15. The focus state determination unit 54 analyzes the focus evaluation value calculated by the focus evaluation value calculation unit 42 and stored in the focus evaluation value storage unit 52 and projects, onto the screen 300, the current focus state as a graph with a color. The user refers to the graph as a supplemental means for the focus adjustment.

As described above, the projection-type video-image display device 200 according to the present embodiment can provides a supplemental means used when the user manually performs a focus adjusting operation. Since the current focus state is displayed as a graph with a color, the user can intuitively understand the focus state.

Described above is an explanation of the present invention based on the embodiments. These embodiments are intended to be illustrative only, and it will be obvious to those skilled in the art that various modifications to constituting elements and processes could be developed and that such modifications are also within the scope of the present invention.

In the above explanation, a description is given regarding the case when the focus state determination unit tracks the amount of a change in the focus evaluation value and calculates the focus evaluation value, obtained when the amount of a change changes from increase to decrease, as the target focus evaluation value. However, the target focus evaluation value may be calculated by acquiring an input signal of a video image projected on the screen 300 and then by analyzing the image. This can be achieved by the focus evaluation value calculation unit 42 acquiring the input signal from the image memory 84 via the video-image signal setting unit 82 and calculating the target value by directly analyzing the acquired input signal.

When the amount of a change in the focus evaluation value is tracked and when the focus evaluation value, obtained when the amount of a change changes from increase to decrease, is calculated as the target focus evaluation value, it is possible that the maximum value cannot be determined until the amount of a change changes from increase to decrease and that only a provisional maximum value is thus calculated. Although the focus evaluation value obtained when the amount of a change changes from increase to decrease can be detected as the maximum value, it is necessary to create a defocused state once after the focus is correctly adjusted, in this case. Thus, the focus adjustment may not be performed efficiently. These situations can be prevented by setting the target focus evaluation value by acquiring the input signal of the video image projected onto the screen 300 and then by analyzing the image. This is advantageous in that a more accurate target value can be set, compared to when acquiring a captured image captured by the image capturing unit 30 and then analyzing the image.

In the above explanation, it is described that the focus state determination unit 54 tracks the amount of a change of the focus evaluation value. When a change in the amount of a change of the calculated focus evaluation value exceeds a predetermined threshold value, the focus state determination unit 54 may delete a focus evaluation value whose amount of a change exceeds the threshold value in the focus evaluation value storage unit 52. The predetermined threshold value is a reference value for the amount of a change of the focus evaluation value that is used to check the reliability as a focus evaluation value. For example, in the case of a situation where a hand is placed in front of the camera during focus assist or where a person passes in front of the camera, a correct focus evaluation value cannot be calculated, and the amount of a change of the focus evaluation value therefore becomes large. As a result, an erroneous operation may be caused. Therefore, such a situation is reproduced by performing an experiment in advance so as to set a predetermined threshold value. This is advantageous in that an erroneous operation such as the one described above can be prevented from occurring.

In the above explanation, a description is given regarding the case where a rectangle, whose longitudinal direction is in the horizontal direction of a video image projected onto the screen, is used as a graph that expresses the focus state information. However, the shape of the graph is not limited to a rectangle. For example, a circle or a polygon such as a triangle may be used. When the graph is a circle, the graph can be realized as a pie chart that associates the focus evaluation value with an angle. When the graph is a polygon such as a triangle, the graph can be similarly realized by associating the focus evaluation value with an area of the graph to be colored.

What is claimed is:

1. A control device mounted on a projection-type video-image display device including: a projection unit that projects a video image onto a screen via a lens; an image capturing unit that captures the screen; and a focus adjustment unit provided on the projection unit and operated manually, comprising:
   a focus evaluation value calculation unit configured to calculate, as a focus evaluation value, a characteristic value that changes in accordance with the focus state of the video image adjusted by the focus adjustment unit by acquiring a captured image captured by the image capturing unit and then by analyzing the image;
   a focus evaluation value storage unit configured to store the focus evaluation value calculated by the focus evaluation value calculation unit and a target value of a focus evaluation value; and
   a focus state determination unit configured to determine a display color of focus state information projected onto the screen as a graph with a color indicating the degree of focus, wherein
   the focus state determination unit includes: a unit for acquiring the focus evaluation value stored in the focus evaluation value storage unit and calculating a change of the focus evaluation value; and a unit for determining focus state information to be displayed by referring to a table that associates a combination of the change of the focus evaluation value, the focus evaluation value, and the target value with the display color of the focus state information.

2. The control device according to claim 1, wherein
   the focus evaluation value becomes larger as a focus state improves, and
   the focus state determination unit tracks the amount of a change in the focus evaluation value stored in the focus evaluation value storage unit, calculates the focus evaluation value, which is obtained when the amount of a change changes from increase to decrease, as the target focus evaluation value, and stores the focus evaluation value in the focus evaluation value storage unit.

3. The control device according to claim 1, wherein the focus evaluation value calculation unit calculates a target value of the focus evaluation value by acquiring an input signal of a video image projected onto the screen and then by analyzing the image and stores the target value in the focus evaluation value storage unit.

4. The control device according to claim 1, wherein the focus evaluation value calculation unit calculates, as the focus evaluation value, at least one of a high-frequency component, the contrast, or the brightness of the captured image and stores the focus evaluation value in the focus evaluation value storage unit.

5. A projection-type video-image display device comprising:
   a projection unit configured to project a video image onto a screen via a lens;
   an image capturing unit configured to capture the image of the screen; and
   the control device according to claim 1.

* * * * *